(12) United States Patent
Tillotson

(10) Patent No.: US 9,871,720 B1
(45) Date of Patent: *Jan. 16, 2018

(54) USING PACKET DUPLICATION WITH ENCAPSULATION IN A PACKET-SWITCHED NETWORK TO INCREASE RELIABILITY

(71) Applicant: Amazon Technologies, Inc., Reno, NV (US)

(72) Inventor: Paul John Tillotson, Herndon, VA (US)

(73) Assignee: Amazon Technologies, Inc., Seattle, WA (US)

( * ) Notice: Subject to any disclaimer, the term of this patent is extended or adjusted under 35 U.S.C. 154(b) by 201 days.

This patent is subject to a terminal disclaimer.

(21) Appl. No.: 14/218,688

(22) Filed: Mar. 18, 2014

(51) Int. Cl.
*G06F 15/16* (2006.01)
*H04L 12/721* (2013.01)
*H04L 12/725* (2013.01)

(52) U.S. Cl.
CPC ............ *H04L 45/14* (2013.01); *H04L 45/306* (2013.01)

(58) Field of Classification Search
CPC .............................. H04L 45/14; H04L 45/306
See application file for complete search history.

(56) References Cited

U.S. PATENT DOCUMENTS

| | | | | |
|---|---|---|---|---|
| 6,304,558 B1 * | 10/2001 | Mysore | ................. | H04W 84/08 370/312 |
| 7,876,673 B2 * | 1/2011 | Ram | ....................... | H04L 12/42 370/222 |
| 2001/0009547 A1 * | 7/2001 | Jinzaki | .............. | H04L 12/40058 370/390 |
| 2010/0205670 A1 * | 8/2010 | Milliken | ............... | G06F 21/562 726/23 |
| 2011/0246666 A1 * | 10/2011 | Aloni | ...................... | H04L 69/16 709/235 |
| 2012/0008505 A1 * | 1/2012 | LaVigne | ............. | H04L 12/4633 370/241 |

(Continued)

FOREIGN PATENT DOCUMENTS

EP  1 168 714 A2  2/2002

OTHER PUBLICATIONS

Storvisor et al., "VXLAN: A Framework for Overlaying Virtualized Layer 2 Networks over Layer 3 Networks," <http://tools.ietf.org/html/draft-mahalingam-dutt-dcops-vxlan-08>, 27 pages (Feb. 3, 2014).

(Continued)

*Primary Examiner* — Yves Dalencourt
(74) *Attorney, Agent, or Firm* — Klarquist Sparkman, LLP

(57) ABSTRACT

Techniques and solutions for performing packet duplication in a packet-switched network are described. For example, duplicates of a network packet can be created and sent to a destination via different network paths. Packet duplication can be performed by a computer that is creating and sending network packets. Packet duplication can also be performed by another type of computing device such as a router that receives network packets and creates duplicates that are then sent to the destination via different network paths. Network packets can be encapsulated using encapsulation packets that include network path indicators that indicate use of different network paths. Multiple copies of a network packet can be received and processed.

20 Claims, 12 Drawing Sheets

(56) References Cited

U.S. PATENT DOCUMENTS

2013/0080567 A1\* 3/2013 Pope .................... G06F 13/385
                                                  709/213
2013/0080612 A1\* 3/2013 Armstrong ............ H04L 45/302
                                                  709/223

OTHER PUBLICATIONS

Wikipedia, "IEEE 802.1Q," <http://en.wikipedia.org/wiki/IEEE_802.1Q>, 3 pages (accessed Mar. 4, 2014).

\* cited by examiner

USING PACKET DUPLICATION WITH ENCAPSULATION IN A PACKET-SWITCHED NETWORK TO INCREASE RELIABILITY

BACKGROUND

In a packet-switched network that connects many computing devices (e.g., via the Internet), there are typically multiple paths from a sending device to a receiving device. The intermediate devices make routing decisions to decide which path a network packet traveling from a sending device to a destination device will take. Many strategies exist for choosing a path, such as choosing the path with the lowest cost, least number of hops, lowest latency, best quality of service, etc. While choosing an appropriate path between a source and a destination can result in efficient delivery of network packets, situations can arise that disrupt network traffic along a particular path, such as congestion, failure of a network connection, etc. While a path can be changed once a failure is detected, network traffic may be interrupted or delayed during the time it takes to identify the failure and select an alternate path to avoid the failure.

DETAILED DESCRIPTION

Overview

Figure 1:
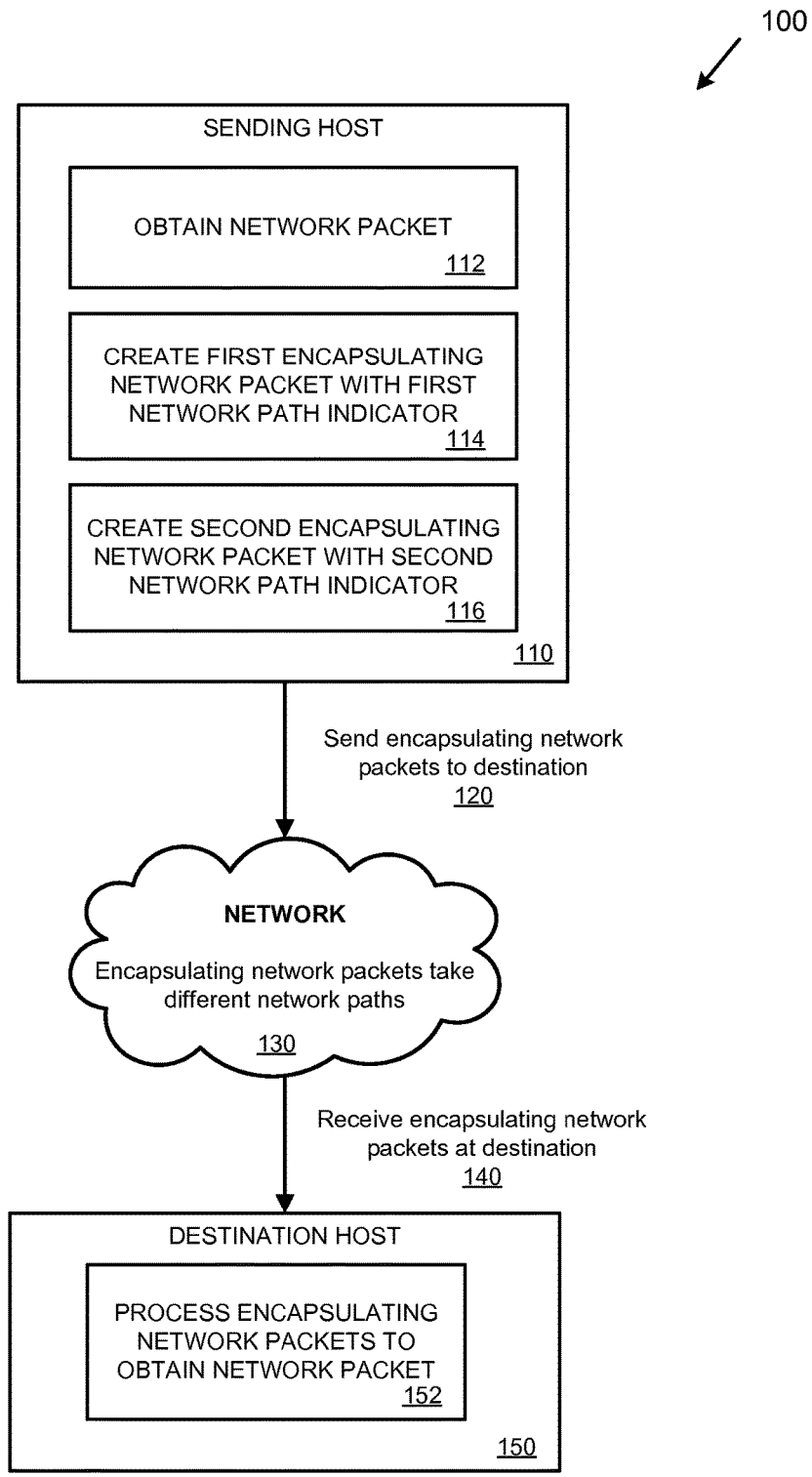
FIG. 1 is a diagram of an example environment for performing packet duplication by a sending host in a packet-switched network.

The following description is directed to techniques and solutions for performing packet duplication in a packet-switched network. For example, duplicates of a network packet can be created and sent to a destination via different network paths. Packet duplication can be performed by a computer that is creating and sending network packets (e.g., by a computer server that is the sending host). Packet duplication can also be performed by another type of computing device (e.g., a router) that receives network packets and creates duplicates that are then sent to the destination via different network paths.

For example, a network may contain multiple routes (paths) from a sending host to a receiving host. The sending host, or an intermediate device (e.g., a router, gateway, or another device along the path between the source host and the destination host), can make a decision (e.g., a packet duplication choice or routing choice) to duplicate a network packet and send different copies of the network packet along a different route. The destination host, or an intermediate device (e.g., a router, gateway, or another device between the source host and the destination host), can receive duplicate network packets and process them (e.g., to provide a single copy of the packet for processing).

In some implementations, packet duplication is performed by creating encapsulating network packets. For example, a sending host (e.g., a computer server) can obtain a network packet (e.g., from a software application running on the sending host), create two encapsulating network packets with duplicate copies of the network packet, and send the encapsulating network packets to a destination. The two encapsulating network packets can contain different network path indicators (e.g., different source port numbers) that are used to control which network path is used between the sending host and the destination host. For example, networking equipment (e.g., a router or gateway) receiving the encapsulating network packets can check the network path indicators and send each encapsulating network packet along a different network path to the destination based on the network path indicators. Packet duplication can be performed for any number of network packets being sent (e.g., for a stream of network packets between the sending host and destination host).

In some implementations, packet duplication is performed by creating multiple copies of a network packet. For example, a sending host or other device (e.g., router or gateway) can obtain network packets and create duplicates of certain types of packets (e.g., only Transmission Control Protocol (TCP) packets). The sending host or other device can then send the duplicates to a destination via different network paths. For example, if a sending host or other device has multiple network adapters (e.g., network interfaces) connected to different networks, one copy of the network packet can be sent via one network adapter and another copy of the network packet can be sent via another network adapter.

A destination host can receive and process duplicate network packets. For example, a destination host can receive duplicate TCP packets and handle them using standard TCP technology (e.g., identify and ignore duplicates by comparing sequence numbers) and/or custom operations (e.g., information about received network packets can be maintained for non-TCP packets in order to detect and handle duplicates). A destination host can receive encapsulating network packets, extract the network packets stored within the encapsulation, and process them (e.g., identify duplicates so that only a single copy of each unique network packet is passed on for use by hardware and/or software of the destination host, such as application software).

The technologies described herein for performing packet duplication in a packet-switched network can provide advantages in various situations, such as increased reliability. For example, if network packets are being delivered via two different network paths and one of the network paths fails, packet delivery can continue uninterrupted via the other network path. Furthermore, performing packet duplication can improve the stability of the network. For example, in the event of a failure of one network path in a traditional network, the remaining network paths in the network may have to take over the increased traffic from the failed path, which can lead to overloaded network conditions and/or degraded performance on the remaining network paths. By using the technologies described herein, packet duplication can be performed such that duplicate packets are sent via multiple network paths and the failure of one of the paths will not result in increased load on the remaining paths (i.e., because multiple paths are already being used and therefore network traffic does not have to be switched to another path in the event of a failure of one path).

The packet duplication technologies described herein can also provide increased performance. For example, network packets that are being delivered slowly via one network path (e.g., due to congestion along the network path) do not affect delivery of duplicate copies of the network packets being sent via another network path. As another example, if a packet normally has a 1/X chance of being delivered slowly, then if two duplicate packets are sent, the chance of both packets arriving slowly is 1/X^2. The increased performance provided by the technologies described herein can have the practical effect of reducing the perceived jitter (e.g., the randomly occurring variation in the amount of time it takes a packet to travel from a source to a destination).

The technologies described herein can provide other advantages over the use of a single network path. For example, because two or more paths are being used concurrently to delivery network packets, the time ordinarily needed by techniques using a single network path to switch over to a new network path when one fails can be reduced or eliminated.

In some implementations, the technologies described herein can be used in environments that have a significant amount of network bandwidth (e.g., enough excess bandwidth to handle duplication of network packets in some situations or for specific types of communications). In addition, the technologies described herein can be used in environments where reliability and/or performance are important considerations. For example, for some types of network communications, reliability and/or performance may be more important than the additional bandwidth used for packet duplication.

The various technologies described herein can be implemented in hardware and/or software of a device (e.g., a server computer, router, gateway, or another type of computing device). For example, a software implementation can include a custom device driver, custom application, and/or custom operating system component.

Duplicating Network Packets

In the embodiments described herein, network packets can be duplicated. For example, a computing device (e.g., server computer, network device, desktop computer, etc.) can duplicate network packets created by the device (e.g., by software running on the device) and/or received by the device (e.g., received by a router from a sending device).

Various types of network packets can be duplicated in a packet-switched network (e.g., an Internet Protocol (IP) based packet-switched network). For example, TCP packets and User Datagram Protocol (UDP) packets can be duplicated. Duplicating a network packet can comprise making multiple copies of the network packet such that each copy is identical. In some implementations, packet duplication is performed to create two identical copies of the network packet. As should be understood, creating two copies of a network packet results in a total of two identical network packets (not three). In other implementations, packet duplication is performed to create three or more identical copies of the network packet. For example in an implementation that uses three different network paths, three copies of the network packet can be created, one for sending via each of the different network paths.

Network packets can be duplicated within an IP based packet-switched network, such as the Internet. Network packets can be sent and/or received between different networks (e.g., between the Internet and a private or local network).

The packet duplication techniques described herein can be performed within a private network, a public network, a cloud computing environment, and/or another type of computing or networking environment in which network packets are sent and received.

The packet duplication techniques described herein can be performed using commercially available or custom hardware, commercially available or custom software, and/or combinations.

In some implementations, packet duplication is performed by network switches (e.g., commercially available network switches). For example, a network packet addressed (e.g., using an IP address) to a destination host can be received by a network switch. The network switch can send an Address Resolution Protocol (ARP) request to determine the physical network address (e.g., Ethernet address or media access control address (MAC address)) of the destination host with the IP address. The ARP request can be received by a custom host (e.g., a computing device running custom software configured to respond to such ARP requests even though the computing device is not the destination host) that sends two ARP responses, a first ARP response containing a first physical network address and a second ARP response containing a second physical network address that is different from the first physical network address. Upon receiving the two ARP responses, the network switch can send a first copy of the network packet to the destination host using the first physical network address and a second copy of the network packet to the destination using the second physical network address. The first and second physical addresses can be reachable via the network switch using different network ports. For example, the network switch can send each copy of the network packet via a different network port which can send each copy of the network packet to the destination via a different network path. In some implementations, a network switch can be a commercially available network switch that does not require any modification to perform packet duplication upon receiving multiple ARP responses.

Different Network Paths

In the embodiments described herein, packet duplication can be performed in order to send duplicate copies of a network packet along different network paths in a packet-switched network. For example, a first copy of a network packet can travel along a network path that is different from a second copy of the network packet.

For example, a computing device (e.g., server, router, gateway, or another type of computing device) can be configured with multiple (e.g., two or more) network interfaces (e.g., multiple network interface controllers (NICs) or network adapters each connected to a different network). For example, a server computer can have two network interface controllers, each connected to a different network. Network packets sent via one of the two network interface controllers can take a different network path than network packets sent via the other of the two network interface controllers (e.g., for at least a portion of the entire route between the source and the destination).

In some implementations, different network interface controllers are connected to different network providers. For example a first network provider can operate a first set of network connections (e.g., network data lines connecting various physical locations) and a second network provider can operate a second set of network connections that are different from those operated by the first network provider. Network packets sent via the first network provider can take a different network path than those sent via the second network provider.

In some implementations, different network interface controllers are connected to the same network provider. For example, the network provider can provide different network connections (e.g., different sets of network data lines) such that network packets take different paths (e.g., via different physical data lines, via different networking equipment, and/or via different paths between different physical locations) when sent via the different network interface controllers.

A network path can indicate a physical network path. For example, network packets sent via a first network path can travel along a set of physical connections (e.g., physical network cables and associated network devices) while network packets sent via a second network path can travel along a different set of physical connections.

In some implementations, different network paths can share some of the same network segments. For example, two different network paths can include some of the same network segments (e.g., network connections where network packets share the same path for the segment) and some different network segments (e.g., different network connections where network packets take different paths for the segment).

Duplicate network packets can take different network paths within the network of a business or organization. For example, a business that operates multiple data centers with many server computers may have many internal networking paths. Packet duplication can be performed to route network traffic between servers, within data centers, and/or between data centers using different network paths (e.g., to provide increased reliability and/or performance).

Encapsulating Network Packets

In some of the embodiments described herein, duplicate network packets are encapsulated for sending via different network paths. Encapsulation can be performed in order to include information directing duplicate network packets to use different network paths. A sending host (or another device, such as a router at the sending side) can create encapsulating network packets, which can then be sent via different network paths to a destination host. The destination host (or another device, such as a router at the destination side) can identify the encapsulating network packets and extract the network packets encapsulated within.

For example, a computing device (e.g., a sending host) can create multiple encapsulating network packets each containing a duplicate copy of a network packet (e.g., two encapsulating network packets in some implementations). The encapsulating network packets can also contain a network path identifier (network path indicator) that is different for each of the encapsulating network packets. For example, a first encapsulating network packet can contain a first network path identifier and a second encapsulating network packet can contain a second network path identifier (different from the first network path identifier). The network path identifiers can indicate which of different network paths to use for sending the encapsulating packet (e.g., which of different network interface controllers to use). The computing device can create encapsulating network packets for additional network packets (e.g., for one or more network connections) using the first network path indicator and the second network path indicator.

Packet duplication using encapsulation can be performed for a stream of network packets (e.g., that are part of a network connection between a sending host and a destination host). For example, for each network packet the sending host can create two encapsulating network packets each with a copy of the original network packet but with different network path indicators (e.g., using two pre-defined network path indicators indicating use of one of two network paths).

Encapsulation can be performed by various computing devices. For example, a sending host (e.g., computer server that is the originating host for the network packets) can obtain a network packet (e.g., from a software application or operating system running on the sending host), create multiple encapsulating network packets with different network path indicators, and send the multiple encapsulating network packets (e.g., using custom hardware and/or software). A computing device receiving network packets can also perform the encapsulation. For example, a router or other network device can receive a network packet (e.g., sent from a sending host, such as a computer server), create multiple encapsulating network packets with different network path indicators, and send the multiple encapsulating network packets (e.g., using custom hardware and/or software).

In some implementations, UDP packets are used for encapsulating network packets. For example, a UDP packet (an encapsulating UDP packet) can be created with the data area containing the original network packet (e.g., an original TCP or UDP packet that has been encapsulated).

In some implementations, the network path indicators are stored in network protocol header information of the encapsulating network packet. For example, in implementations where UDP packets are used as encapsulating network packets, the network path indicators can be stored in the source port field of the encapsulating UDP packet header. For example, a device (e.g., a router) can receive the encapsulating network packet, examine the UDP header for the network path indicator, and send the encapsulating network packet along a network path as indicated by the network path indicator (e.g., an odd value network path indicator can specify a first network path and an even value network path indicator can specify a second network path). In other implementations, the network path indicators can be stored other places (e.g., in other fields of the encapsulating packet header).

In a specific implementation, encapsulation is performed using a virtual network protocol that has the following conceptual format:

[UDP header with destination IP address=<destination host>, destination port=<custom port>][4 octet network path identifier][original network packet payload]

In the above format, the UDP header is a standard UDP header (as defined in RFC 768). The <custom port> is a port on which the sender and receiver are configured to transmit the encapsulating packets. The network path identifier (which is an addition to the standard UDP header in this implementation) identifies the network path (e.g., odd for a first path and even for a second path, 0 for a first path and 1 for a second path, 0, 1, and 2 for three different network paths, etc.). The network path identifier is 4 octets in this implementation, but can be larger or smaller. The original network packet payload is the content of the network packet (e.g., an original UDP or TCP packet) that is being encapsulated.

In other implementations, a standard UDP header (as defined in RFC 768) can be used for encapsulating network packets. For example, the UDP source port field of the encapsulating network packet can store the network path identifier.

In some implementations, encapsulating network packets can be performed using a virtual local area network (VLAN) tag according to the IEEE 802.1Q protocol, or according to a different layer 2 encapsulation protocol.

In some implementations, encapsulating network packets can be performed using virtual extensible LAN (VXLAN) encapsulation techniques, or according to a different layer 3 encapsulation protocol.

In some implementations, a combination of encapsulated packets and unencapsulated packets are used. For example a device can create two copies of a network packet. The device can encapsulate just one of the two copies. The device can then send the encapsulated copy using a first network path and the unencapsulated copy using a second network path. A combination approach can be useful with a heterogeneous network in which some of the destination hosts are configured to process encapsulating network packets but others are not. A destination host that is not configured to process encapsulating network packets can process the unencapsulated network packets normally while ignoring the encapsulating network packets. A destination host that is configured to process encapsulating network packets can take advantage of the benefits of the packet duplication techniques described herein and process both types of packets (e.g., if one of the network paths goes down, the destination host can still receive and process packets via the other network path).

Duplicating TCP Packets

In some of the embodiments described herein, packet duplication is performed only for certain types of network packets, such as TCP packets. For example, a device such as a router (e.g., using custom hardware and/or software) can receive network packets from one or more sending hosts. The router can determine which of the received network packets are TCP packets. For any received TCP packet, the router can duplicate the TCP packet and send each copy via a different network path to the destination. When the router receives non-TCP packets, the router can pass them along normally without performing packet duplication. Duplication of only TCP packets can also be performed by a sending host (e.g., a computer server using custom software such as a custom device driver), such as a sending host with two network interface controllers that can duplicate TCP packets and send each copy via a different network path to the destination.

Performing packet duplication for only TCP packets can be used in a solution where the destination host uses a standard TCP/IP implementation (e.g., the destination host does not need to be modified or use custom software to handle the duplicate TCP packets). The TCP protocol is configured to handle duplicates at the destination host by examining sequence numbers and dropping duplicate TCP packets that have the same sequence number.

Destination Host

In the embodiments described herein, a destination host can receive and process duplicate network packets. The destination host refers to the end recipient of the network packets (e.g., the computer server receiving the network packets).

In some implementations, the destination host receives duplicate TCP packets and processes them according to the TCP protocol. For example, the destination host can automatically drop duplicate TCP packets with the same sequence number.

In some implementations, the destination host has custom hardware and/or software to handle duplicate network packets by examining the network packets (e.g., in order to handle non-TCP packets, such as UDP packets). For example, the destination host can keep copies of all the network packets received and match each received network packet with the network packets already received to identify duplicate packets. However, this solution can have difficulty distinguishing between two packets that have not been duplicated but happen to have the same content (i.e., two packets that happen to be identical but that were not duplicated).

As an alternative to keeping copies of all network packets received to identify duplicates, the destination host can only keep a copy of a received network packets until a duplicate is received of that network packet. In this situation, a later packet that happens to be identical, but is not a duplicate of an earlier packet, will not be dropped.

As an additional technique when keeping copies of network packets received, the destination host can store a hash of the network packets received. Storing a hash of the received network packets can improve performance (e.g., when determining if received packet matches one already received by comparing hash values) and reduce the amount of storage needed for the received network packets. Alternatively, the destination host can store a cryptographic hash of the network packets received, which can reduce the chances of different network packets having the same hash value.

In some implementations, the destination host has custom hardware and/or software to handle duplicate network packets. For example, a destination host can be configured to examine duplicate network packets for a sequence number (e.g., UDP packets where a packet sequence number has been added such that duplicate UDP packets have the same packet sequence number). When duplicate sequence numbers are found, the destination host can drop (e.g., delete, ignore, or remove) duplicate network packets (e.g., duplicates received after the first copy). In some implementations, the following algorithm is used to remove duplicates:

1. An empty table of packets received is created.
2. When a packet with a sequence number S arrives, the index S in the table is checked.
   2a. If the index is not already marked, entry S is marked, and the packet is delivered (processed by the destination host).
   2b. Otherwise, the packet is discarded because it is a duplicate.

Another technique can be applied using sequence numbers (e.g., for UDP packets where a sequence number has been added) that uses a fixed-size indexable queue instead of a table of packets. This technique can ensure that only one copy of a network packet is delivered and the amount of memory needed to store fixed-size queue is not affected by the number of packets received. When the destination host receives a packet with sequence number S, the following algorithm is performed:

1. If S is within the range of the queue and the entry is not marked, entry S is marked and the packet is delivered (e.g., processed normally).

2. If S is within the range of the queue and the entry is marked, the packet is discarded because it is a duplicate.

3. If S is greater than the largest entry in the queue, the smallest entries in the queue are discarded and larger entries are added until S is reached, entry S is marked, and the packet is delivered.

4. If S is less than the smallest entry in the queue, the packet is discarded. In an alternate implementation, if S is less than the smallest entry in the queue, the packet is still delivered which can ensure that no packet that is received will be discarded (unless it is a duplicate of an already received packet).

As an alternate technique to the fixed-size queue implementation, a sparse data structure, such as a hash table or red-black tree, can be used that only stores entries that are marked (indicating a packet with sequence number S has been received). This technique may allow for more efficient memory utilization.

Environments for Performing Packet Duplication

In any of the embodiments described herein, environments can be provided that support packet duplication in a packet-switched network. For example, the environment can comprise various computing devices (e.g., server computers, networking devices, sending hosts, destination hosts, etc.). The environment can include various types of packet-switched networks (e.g., public and/or private packet-switched networks, the Internet, etc.).

FIG. 1 is a diagram of an example environment 100 for performing packet duplication by a sending host in a packet-switched network. The type of packet duplication depicted in the example environment 100 includes creating encapsulating network packets.

The example environment 100 includes a sending host 110. For example, the sending host 110 can be a server computer or another type of computing device that generates network packets (e.g., via software and/or hardware of the sending host 110).

The sending host 110 performs a number of operations in order to create and send duplicate network packets using encapsulation. First, the sending host 110 obtains a network packet as depicted at 112 (e.g., from a software application, operating system, network device driver, etc.). The sending host 110 then creates a first encapsulating network packet with a first network path indicator (as depicted at 114) and a second encapsulating network packet with a second network path indicator (as depicted at 116). The first and second encapsulating network packets also include copies of the network packet obtained at 112. For example, the network packet (obtained at 112) can be a TCP or UDP packet, which can be encapsulated in a UDP encapsulating network packet.

In some implementations, the network path indicators are source port numbers (e.g., UDP source port numbers in an encapsulating UDP header). For example, a different source port number can be included in each of the two encapsulating network packets (e.g., an odd source port number in one of the encapsulating network packets and an even source port number in the other encapsulating network packets). In other implementations, other network path indicators are used (e.g., indicators contained in other network protocol header fields of the encapsulating network packets).

In some implementations, the sending host 110 creates more than two encapsulating network packets. For example, the sending host 110 can create three or more encapsulating network packets in order to send the network packet via three or more different network paths.

Once the encapsulating network packets have been created, the sending host 110 sends the encapsulating network packets to the destination host 150, as depicted at 120. For example, the sending host 110 can send the encapsulating network packets to the destination host 150 by sending the encapsulating network packets via a network interface of the sending host 110 with a destination identifier (e.g., an IP address of the destination host 150) in a protocol header field (e.g., a destination address header field of an IP header).

The encapsulating network packets are sent by the sending host 110 over a network 130. The network 130 can comprise various types of devices and network connections (e.g., routers, gateways, data lines, etc.). The encapsulating network packets take different network paths through the network 130. For example, one or more devices of the network 130 can receive the encapsulating network packets, check the network path indicators, and send each of the encapsulating network packets via different network paths (e.g., using different network interface controllers) based on the network path indicators. For example, the network 130 can comprise a networking device, such as a router. The networking device can receive the encapsulating network packets, examine the network path indicators, and send the encapsulating network packets to the destination host 150 via different network paths.

As depicted at 140, the encapsulating network packets are received at the destination host 150. The destination host 150 processes the encapsulating network packets to obtain the network packet, as depicted at 152. For example, the destination host 150 can extract the network packet that is encapsulated in the encapsulating network packet. If multiple copies of the same network packet are received by the destination host 150, the destination host can keep only one copy (e.g., the other can be discarded).

Alternatively, the encapsulating network packets can be processed before they are sent to the destination host 150. For example, a router or other device at the destination side of the network 130 can receive the encapsulating network packets and pass along just one copy of the network packet (e.g., unencapsulate the network packet) to the destination host 150 (e.g., processing the encapsulating network packets, as depicted at 152, can be moved to a device in the network 130).

Alternatively, the sending host 110 can send unencapsulated network packets (e.g., TCP and/or UDP network packets) to destination 150 via network 130. A device (e.g., a router or gateway) within the network 130 can then receive the unencapsulated network packets, perform the encapsulation, and send multiple encapsulating network packets to the destination 150.

In some implementations, performing packet duplication using encapsulating network packets (e.g., as part of a virtual network protocol) can be performed dynamically. For example, packet duplication using encapsulating network packets can be selected on a communication-by-communication basis (e.g., a connection-by-connection basis) or based on some other criteria. For example, an application can enable packet duplication for a particular network connection to a particular destination host. As another example, a list of hosts or other devices (e.g., networking devices) can be maintained that support packet duplication. Packet duplication can be enabled (e.g., automatically enabled) for communications supporting packet duplication (e.g., with sending and/or receiving hosts supporting packet duplication and/or intermediate networking devices supporting packet duplication).

Figure 2:
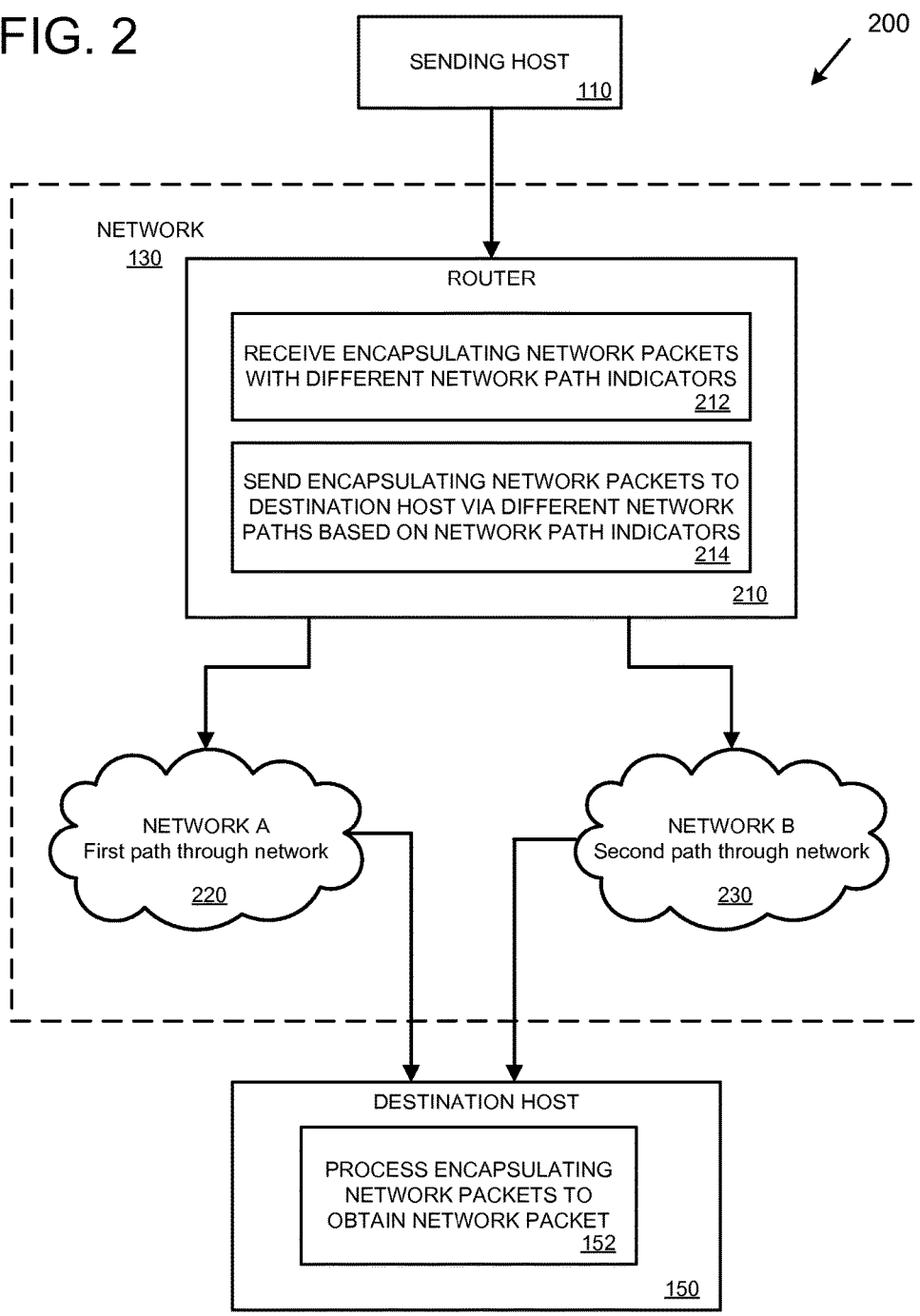
FIG. 2 is a diagram of an example environment for performing packet duplication including a router for sending encapsulating network packets.

FIG. 2 is a diagram of an example environment 200 for performing packet duplication by a routing device in a packet-switched network. The type of packet duplication depicted in the example environment 200 includes creating encapsulating network packets.

The example environment 200 depicts operations performed by a router 210 (e.g., a network routing device) within the network 130 that receives the encapsulating network packets from the sending host 110 (as depicted in FIG. 1). The router 210 receives the encapsulating network packets with different network path indicators (e.g., two encapsulating network packets each comprising an identical copy of the original network packet but with different network path indicators), as indicated at 212. The router 210 sends the encapsulating network packets to the destination host 150 via different network paths, as indicated by 214. For example, the router 210 sends a first encapsulating network packet with a first network path indicator via a first network path 220 through the network 130 and sends a second encapsulating network packet with a second network path indicator via a second network path 230 through the network 130.

Figure 3:
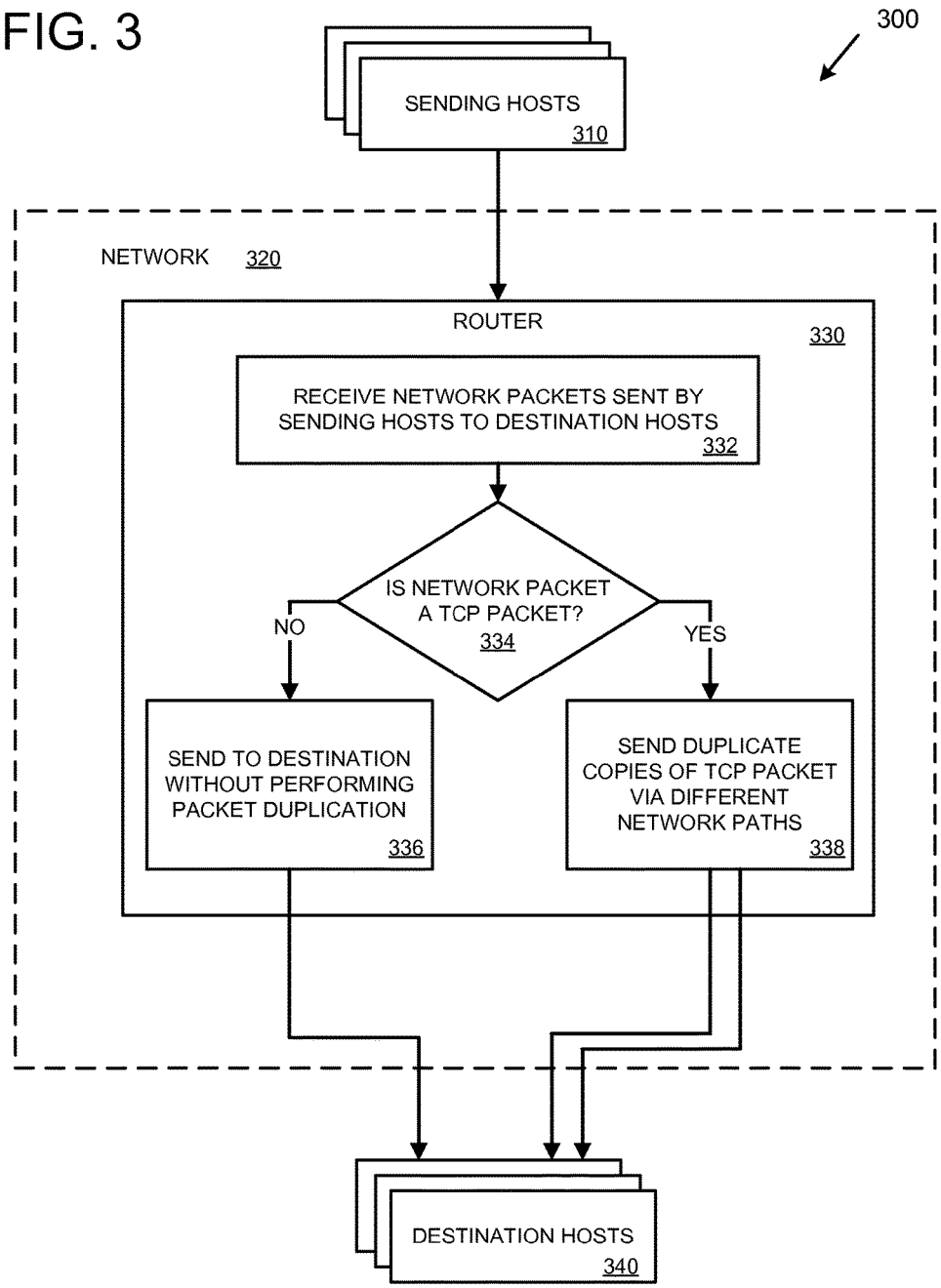
FIG. 3 is a diagram of an example environment for performing packet duplication including a router for duplicating Transmission Control Protocol (TCP) packets.

FIG. 3 is a diagram of an example environment 300 for performing packet duplication of TCP packets. As depicted in the environment 300, sending hosts 310 send network packets (e.g., UDP network packets, TCP network packets, and/or network packets with other network protocols) to a destination host 340 via a network 320.

The network packets sent by the sending hosts 310 are received within the network 320 by a router 330 (e.g., a network routing device), as depicted at 332. The router 330 in the example environment 300 is configured (e.g., via custom hardware and/or software) to only duplicate TCP packets. Specifically, the router 330 checks a received network packet to determine if it is a TCP packet, as depicted at 334. If the network packet is a TCP packet, the router 330 creates duplicate copies of the TCP packet (e.g., two copies in some implementations) and sends each copy to the destination (e.g., one of the destination hosts 340) via a different network path (e.g., using one of multiple network interface connections), as depicted at 338. If the network packet is not a TCP packet, the router 330 sends the packet to the destination host (e.g., one of the destination hosts 340) without duplicating the packet, as depicted at 336.

Methods for Performing Packet Duplication

In any of the embodiments described herein, methods can be provided for performing packet duplication in a packet-switched network (e.g., creating, sending, receiving, managing, and/or processing duplicate network packets). For example, packet duplication can be performed using encapsulating network packets. Packet duplication can also be performed by duplicating specific types of packets (e.g., TCP packets).

Figure 4:
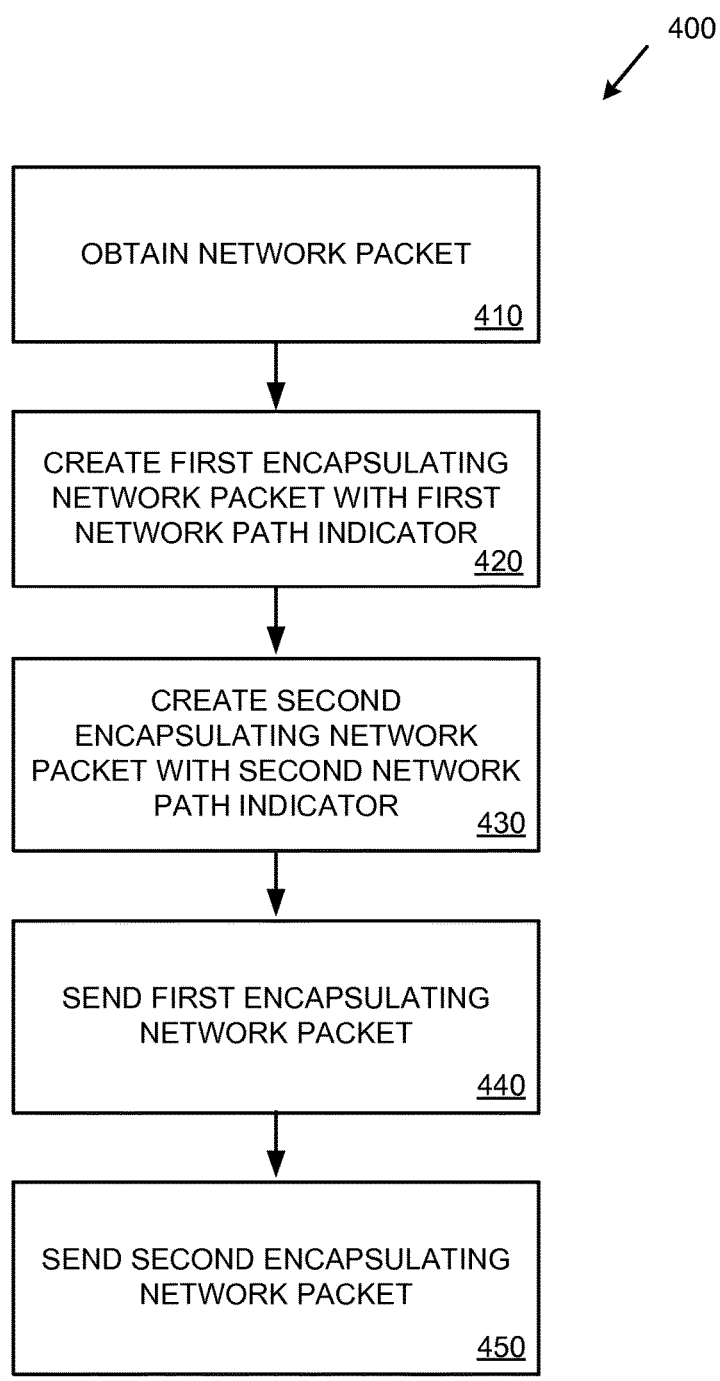
FIG. 4 is a flowchart of an example method for performing packet duplication in a packet-switched network.

FIG. 4 is a flow chart of an example method 400 for performing packet duplication in a packet-switched network. For example, the example method 400 can be performed by the sending host 110 depicted in FIG. 1.

At 410, a network packet is obtained. The network packet is to be sent from a sending host to a destination host (e.g., the network packet may have an IP header identifying a sender IP address and a recipient IP address). The network packet can be a TCP packet, a UDP packet, or another type of network packet.

At 420, a first encapsulating network packet is created. The first encapsulating network packet comprises a first copy of the network packet (obtained at 410) and a first network path indicator.

At 430, a second encapsulating network packet is created. The second encapsulating network packet comprises a second copy of the network packet (obtained at 410) and a second network path indicator.

In some implementations, the network path indicators are source port numbers (e.g., the first network path indicator can be an odd source port number and the second network path indicator can be an even source port number).

In some implementations, the encapsulating network packets are UDP encapsulating network packets where a UDP header (e.g., a standard or custom format UDP header) encapsulates the copies of the original network packet (received at 410). For example, a header field of the UDP encapsulating network packet can be used to store the network path indicator (e.g., in the source port field or the destination port field)

At 440, the first encapsulating network packet is sent to the destination. At 450, the second encapsulating network packet is sent to the destination. The first and second encapsulating network packets are sent via different network paths according to the network path indicators.

Figure 5:
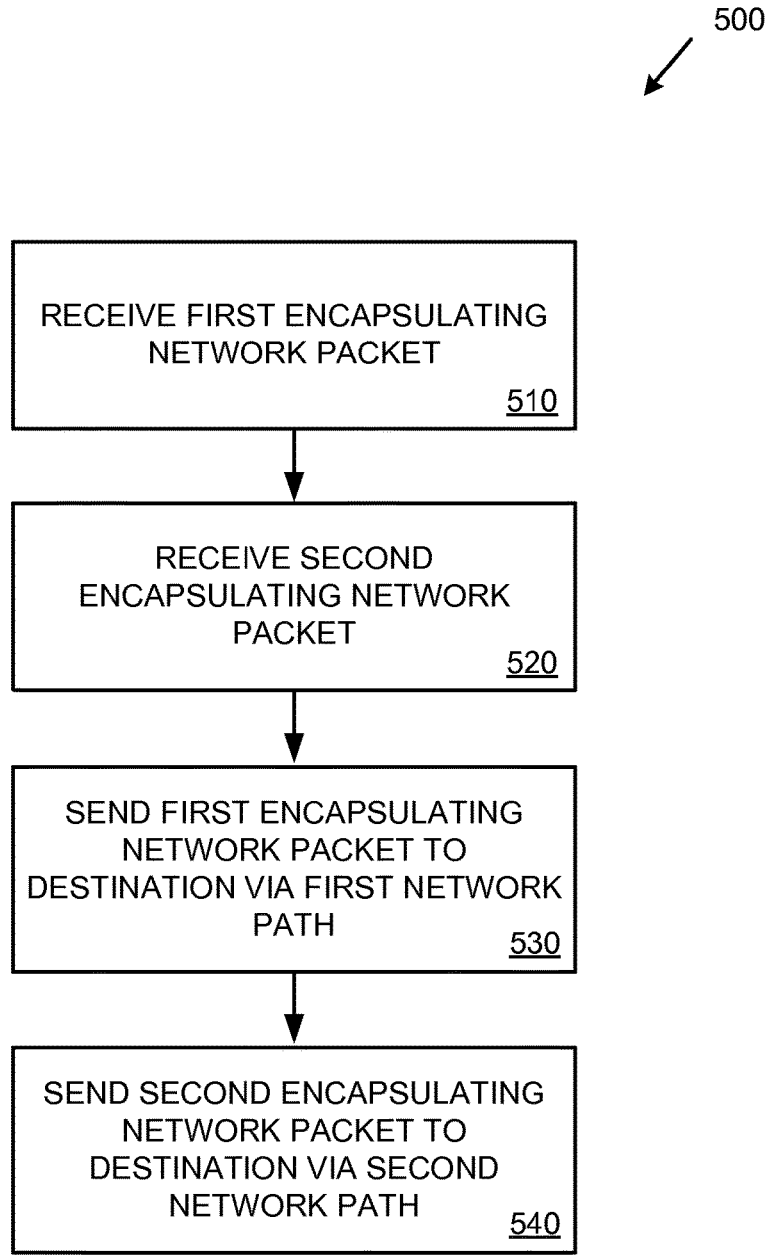
FIG. 5 is a flowchart of an example method for managing duplicate packets in a packet-switched network.

FIG. 5 is a flow chart of an example method 500 for performing packet duplication in a packet-switched network. For example, the example method 500 can be performed by the router 210 depicted in FIG. 2.

At 510, a first encapsulating network packet is received. The first encapsulating network packet comprises a first copy of a network packet being sent from a sending host to a destination host and a first network path indicator.

At 520, a second encapsulating network packet is received. The second encapsulating network packet comprises a second copy of the network packet being sent from the sending host to the destination host and a second network path indicator.

At 530, the first encapsulating network packet is sent to the destination host via a first network path according to the first network path indicator. At 540, the second encapsulating network packet is sent to the destination host via a second network path according to the second network path indicator. In some implementations, the network path indicators are source port numbers (e.g., the first network path indicator can be an odd source port number and the second network path indicator can be an even source port number). In some implementations, the encapsulating network packets are sent at 530 and 540 via a first and second network interface connection.

Figure 6:
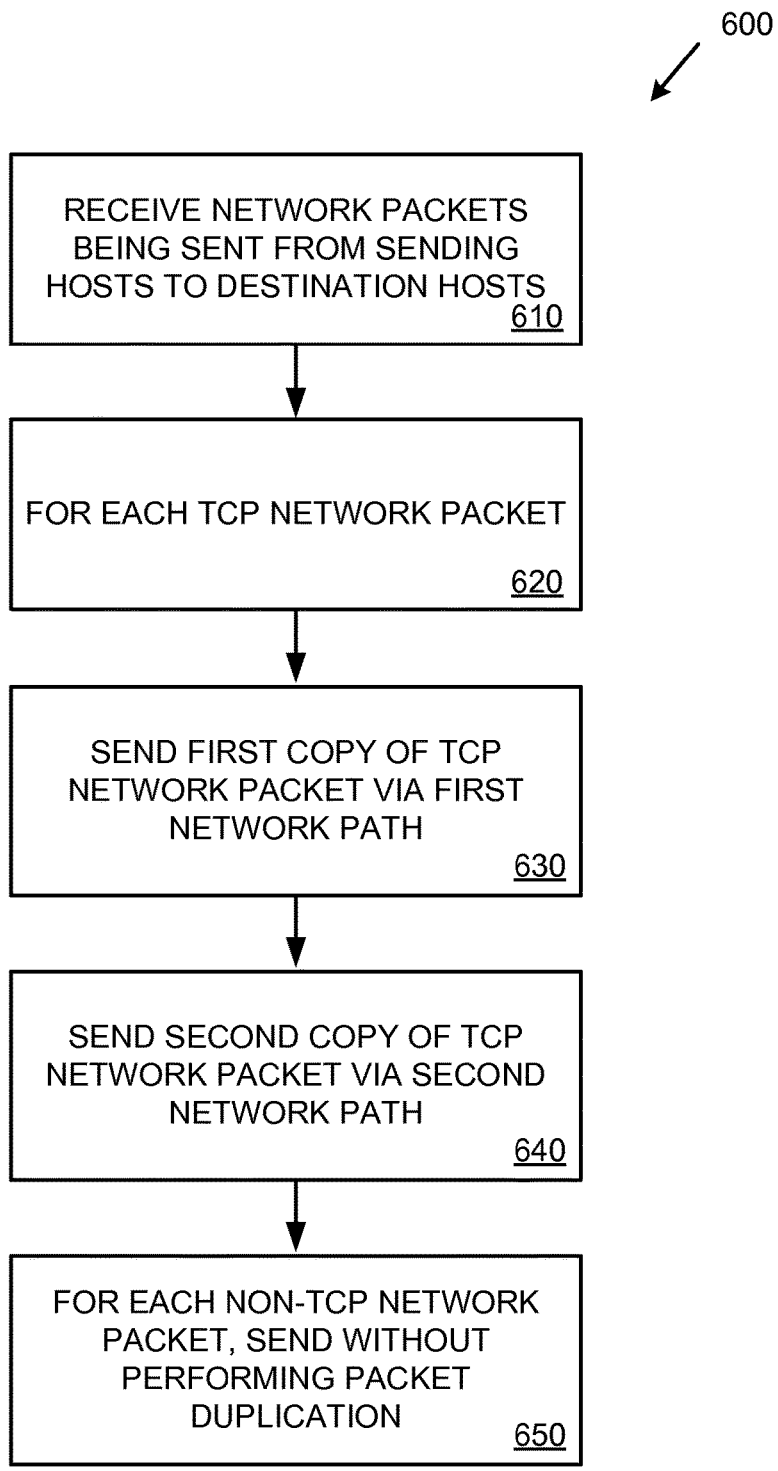
FIG. 6 is a flowchart of an example method for performing packet duplication of TCP packets in a packet-switched network

FIG. 6 is a flow chart of an example method 600 for performing packet duplication of TCP packets in a packet-switched network. For example, the example method 600 can be performed by the router 330 depicted in FIG. 3.

At 610, network packets are received. The network packets are being sent from sending hosts to destination hosts. For example, the network packets can be addressed from sending hosts (e.g., identified via IP addresses of the sending hosts) to destination hosts (e.g., identified via IP addresses of the destination hosts). The network packets can include TCP packets, UDP packets, and/or other types of network packets.

At 620, the received network packets are checked, and a number of operations are performed only for TCP packets. Specifically, if a TCP packet is found, the TCP packet is duplicated and a first copy of the TCP network packet is sent via a first network path (as depicted at 630) and a second copy of the TCP network packet is sent via a second network path (as indicated at 640).

At 650, each of the non-TCP packets are sent normally, without performing packet duplication.

Figure 7:
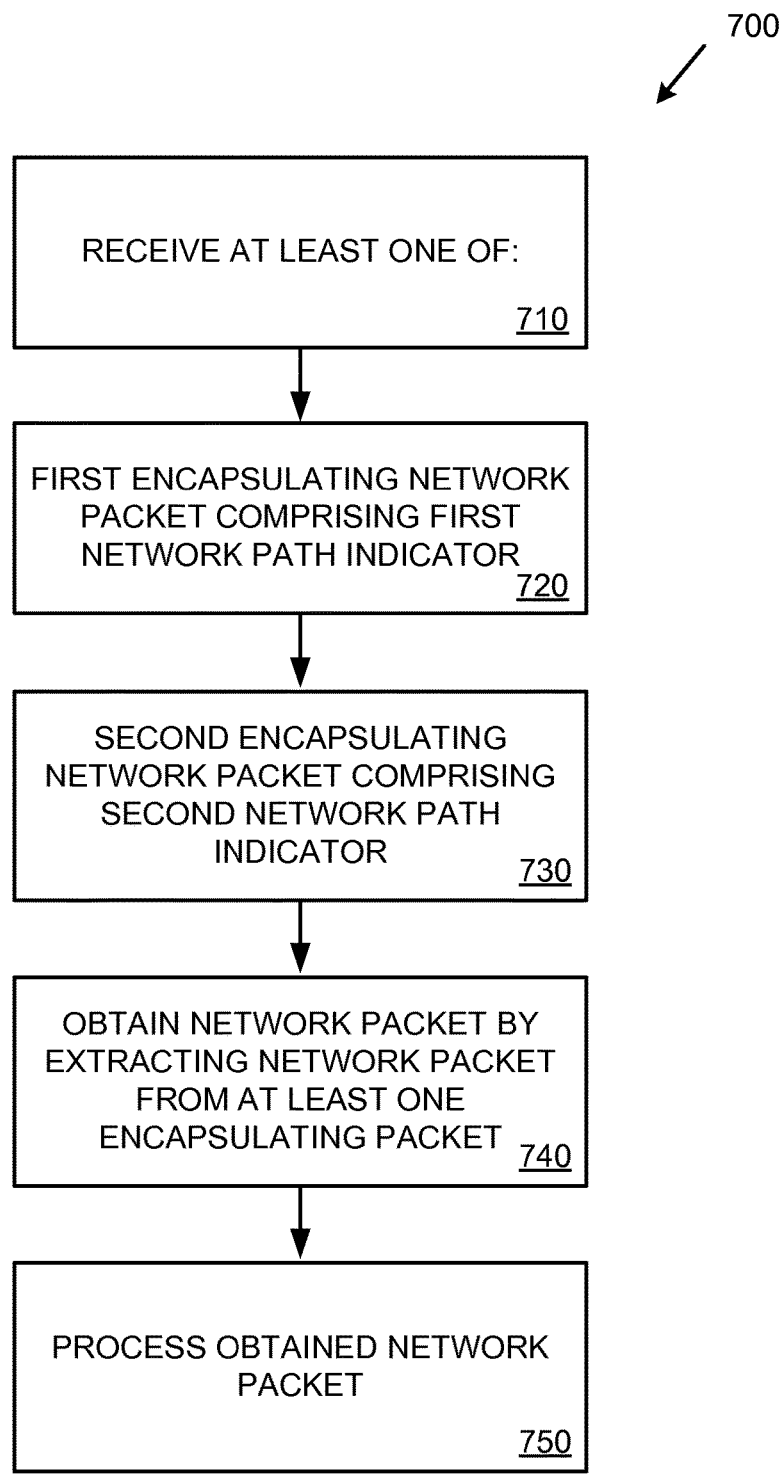
FIG. 7 is a flowchart of an example method for receiving duplicate packets in a packet-switched network.

FIG. 7 is a flow chart of an example method 700 for receiving duplicate packets in a packet-switched network. For example, the example method 700 can be performed by the destination host 150 depicted in FIGS. 1 and 2.

At 710, one or more encapsulating network packets are received (e.g., by a destination host). The encapsulating network packets include a first encapsulating network packet comprising a first copy of a network packet and a first network path indicator (as depicted at 7200 and a second encapsulating network packet comprising a second copy of the network packet and a second network path indicator (as depicted at 730). In some situations, both encapsulating network packets are received (e.g., if both network paths are functioning properly). However, in some situations only one of the encapsulating network packets is received (e.g., if one of the network paths has failed or one of the encapsulating network packets is not received for some other reason).

At 740, the network packet is obtained from at least one of the received encapsulating network packets by extracting the network packet that is encapsulated within the encapsulating network packet(s).

At 750, the obtained network packet is processed. For example, the obtained network packet can be provided for use by a software application or operating system component running on the destination host.

Figure 8:
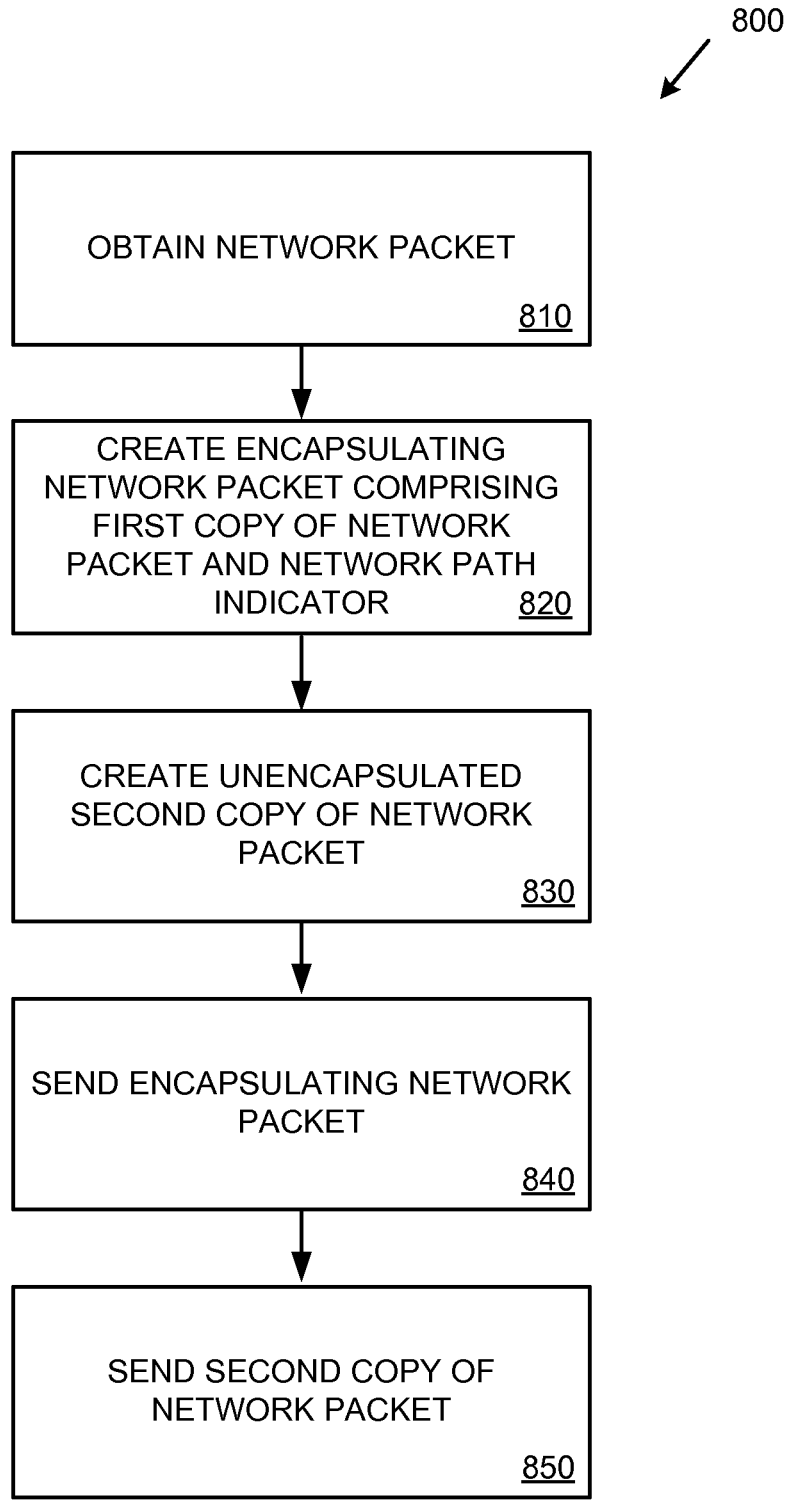
FIG. 8 is a flowchart of an example method for performing packet duplication using a hybrid approach.

FIG. 8 is a flowchart of an example method 800 for performing packet duplication using a hybrid approach in which at least one copy of a network packet is encapsulated in an encapsulating network packet, and at least one other copy of the network packet is unencapsulated (not encapsulated). For example, using this approach, the encapsulating network packet can take a different network path than the unencapsulated network packet (e.g., a router receiving the packets can send the packets via different network paths). In addition, using this approach a destination host (or other intermediate devices along the network path) that can process both encapsulating network packets and unencapsulated network packets can take advantage of packet duplication while a destination host (or other intermediate devices along the network path) that cannot process encapsulating network packets can still receive and process unencapsulated network packets.

At 810, a network packet is obtained. The network packet is addressed from a sending host to a destination host (e.g., the network packet may have an IP header identifying the sending host IP address and the destination host IP address). The network packet can be a TCP packet, a UDP packet, or another type of network packet.

At 820, an encapsulating network packet is created. The encapsulating network packet comprises a first copy of the network packet (obtained at 810) and a network path indicator. In some implementations, the network path indicator is a source port number (e.g., stored in a source port field of the encapsulating network packet). In some implementations, the encapsulating network packet is a UDP encapsulating network packets where a UDP header (e.g., a standard or custom format UDP header) encapsulates the copy of the original network packet (received at 810). For example, a header field of the UDP encapsulating network packet can be used to store the network path indicator (e.g., in the source port field or the destination port field).

At 830, a second copy of the network packet is created. The second copy of the network packet is not encapsulated.

At 840, the encapsulating network packet is sent. At 850, the second copy of the network packet is sent.

In some implementations, the network path indicator in the encapsulating network packet (e.g., as created at 820) instructs a router (e.g., a computing device that performs networking functions in a network, such as network packet routing functions) receiving the encapsulating network packet to route the encapsulating network packet via a different network path than the unencapsulated network packet (e.g., as created at 830). In some implementations, a router routes the encapsulating network packet and the unencapsulated network packet via different network paths based on other criteria (e.g., based on the contents of the packets).

In some implementations, the encapsulating network packet includes a first destination port number in header information of the encapsulating network packet, and the second copy of the network packet comprises a second destination port number different from the first destination port number. The different destination port numbers can be used to send the different packets via different network paths (e.g., a router can route the encapsulating network packet and the unencapsulated network packet via different network paths based on the different destination port numbers).

Example Service Provider Environments

Figure 9:
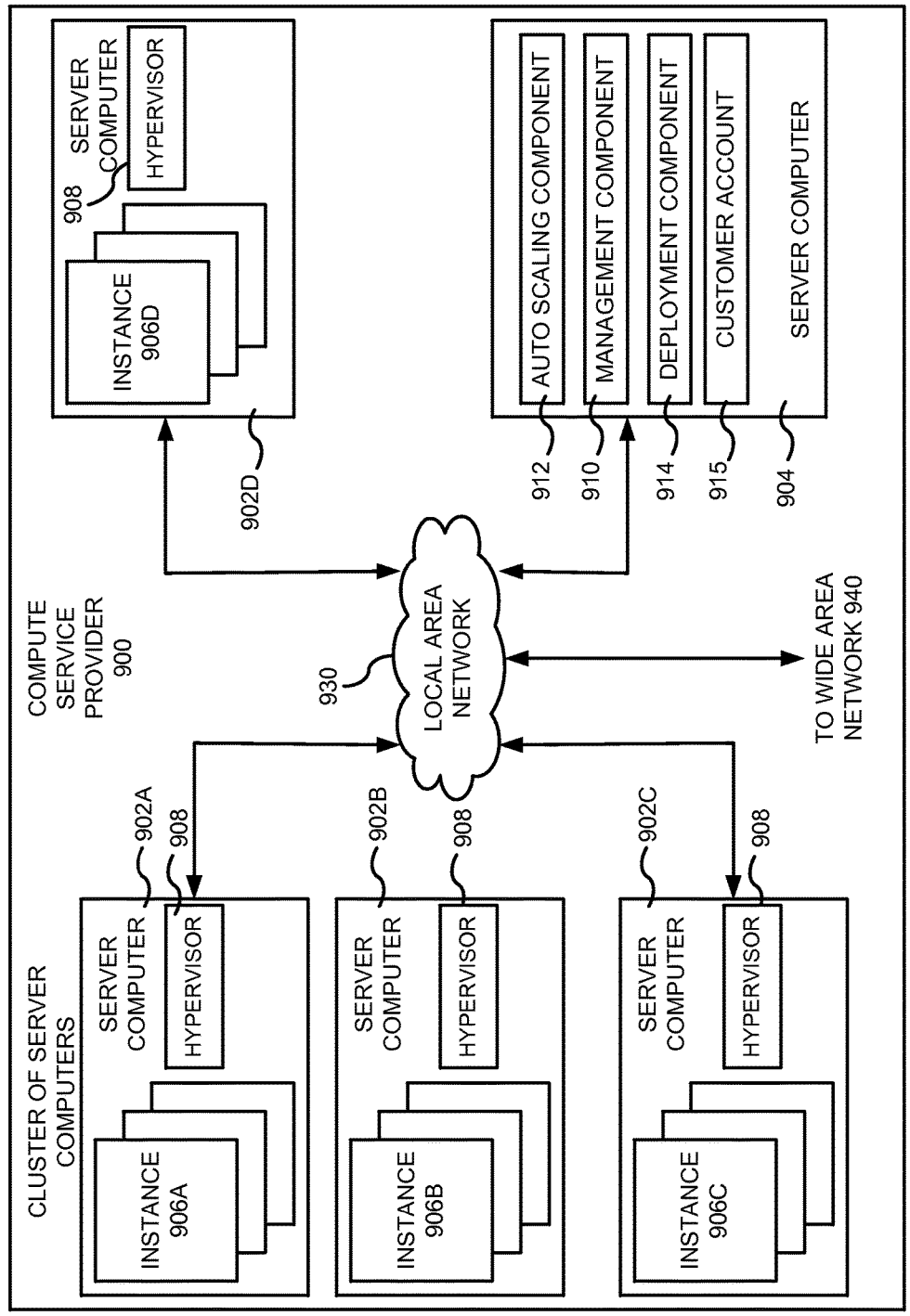
FIG. 9 is an example system diagram showing a plurality of virtual machine instances running in the multi-tenant environment.

FIG. 9 is a computing system diagram of a network-based compute service provider 900 that illustrates one environment in which embodiments described herein can be used. By way of background, the compute service provider 900 (i.e., the cloud provider) is capable of delivery of computing and storage capacity as a service to a community of end recipients. In an example embodiment, the compute service provider can be established for an organization by or on behalf of the organization. That is, the compute service provider 900 may offer a "private cloud environment." In another embodiment, the compute service provider 900 supports a multi-tenant environment, wherein a plurality of customers operate independently (i.e., a public cloud environment). Generally speaking, the compute service provider 900 can provide the following models: Infrastructure as a Service ("IaaS"), Platform as a Service ("PaaS"), and/or Software as a Service ("SaaS"). Other models can be provided. For the IaaS model, the compute service provider 900 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 900 using networked client devices, such as desktop computers, laptops, tablets, smartphones, etc. running web browsers or other lightweight client applications. Those skilled in the art will recognize that the compute service provider 900 can be described as a "cloud" environment.

The particular illustrated compute service provider 900 includes a plurality of server computers 902A-902D. While only four server computers are shown, any number can be used, and large centers can include thousands of server computers. The server computers 902A-902D can provide computing resources for executing software instances 906A-906D. In one embodiment, the instances 906A-906D are virtual machines. As known in the art, a virtual machine is an instance of a software implementation of a machine (i.e. a computer) that executes applications like a physical machine. In the example, each of the servers 902A-902D can be configured to execute a hypervisor 908 or another type of program configured to enable the execution of multiple instances 906 on a single server. For example, each of the servers 902A-902D can be configured (e.g., via the hypervisor 908) to support one or more virtual machine slots, with each virtual machine slot capable of running a virtual machine instance (e.g., server computer 902A could be configured to support three virtual machine slots each running a corresponding virtual machine instance). Additionally, each of the instances 906 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 904 can be reserved for executing software components for managing the operation of the server computers 902 and the instances 906. For example, the server computer 904 can execute a management component 910. A customer can access the management component 910 to configure various aspects of the operation of the instances 906 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 912 can scale the instances 906 based upon rules defined by the customer. In one embodiment, the auto scaling component 912 allows a customer to specify scale-up rules for use in determining when new instances should be instantiated and scale-down rules for use in determining when existing instances should be terminated. The auto scaling component 912 can consist of a number of subcomponents executing on different server computers 902 or other computing devices. The auto scaling component 912 can monitor available computing resources over an internal management network and modify resources available based on need.

A deployment component 914 can be used to assist customers in the deployment of new instances 906 of computing resources. The deployment component can have access to account information associated with the instances, such as who is the owner of the account, credit card information, country of the owner, etc. The deployment component 914 can receive a configuration from a customer that includes data describing how new instances 906 should be configured. For example, the configuration can specify one or more applications to be installed in new instances 906, provide scripts and/or other types of code to be executed for configuring new instances 906, provide cache logic specifying how an application cache should be prepared, and other types of information. The deployment component 914 can utilize the customer-provided configuration and cache logic to configure, prime, and launch new instances 906. The configuration, cache logic, and other information may be specified by a customer using the management component 910 or by providing this information directly to the deployment component 914. The instance manager can be considered part of the deployment component.

Customer account information 915 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc.

A network 930 can be utilized to interconnect the server computers 902A-902D and the server computer 904. The network 930 can be a local area network (LAN) and can be connected to a Wide Area Network (WAN) 940 so that end users can access the compute service provider 900. It should be appreciated that the network topology illustrated in FIG. 9 has been simplified and that many more networks and networking devices can be utilized to interconnect the various computing systems disclosed herein.

Packet duplication can be performed within the compute service provider 900. For example, the server computers 902A-902D can communicate with each other via the local area network 930 and/or with outside hosts via the wide area network 940 using the packet duplication technologies described herein. As an example, server computer 902A can create multiple encapsulating network packets comprise duplicate copies of a network packet and different network path indicators. The encapsulating network packets can take different network paths through the local area network 930 to a destination host (e.g., server computer 902B).

Figure 10:
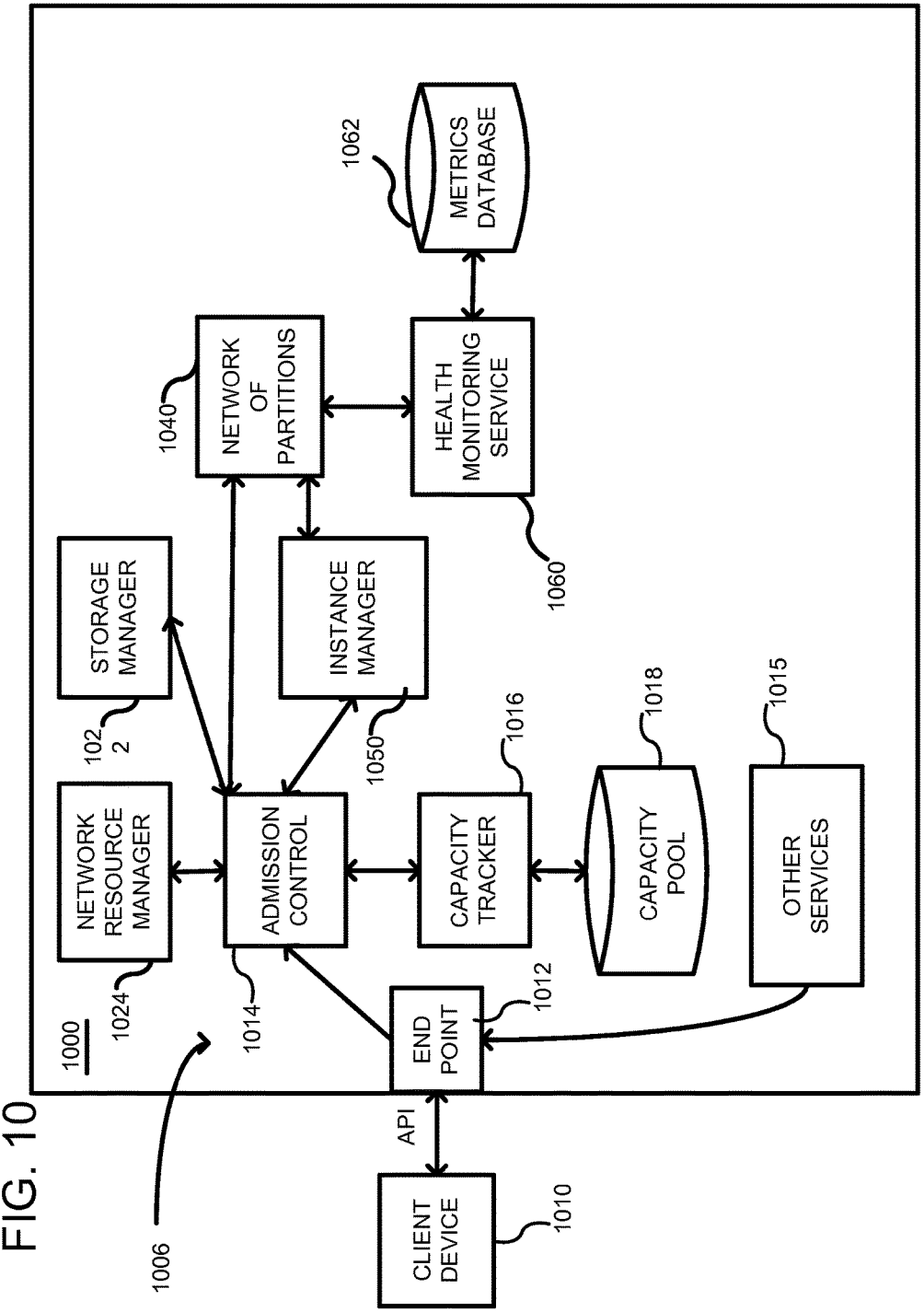
FIG. 10 shows further details of an example system including a plurality of management components associated with a control plane.

FIG. 10 illustrates in further detail management components 1006 that can be used in the multi-tenant environment of the compute service provider 900. In order to access and utilize instances (such as instances 906 of FIG. 9), a client device can be used. The client device 1010 can be any of a variety of computing devices, mobile or otherwise including a cell phone, smartphone, handheld computer, Personal Digital Assistant (PDA), desktop computer, etc. The client device 1010 can communicate with the compute service provider 900 through an end point 1012, which can be a DNS address designed to receive and process API requests. In particular, the end point 1012 can be a web server configured to expose an API. Using the API requests, a client 1010 can make requests to implement any of the functionality described herein. Other services 1015, which can be internal to the compute service provider 900, can likewise make API requests to the end point 1012.

Other general management services that may or may not be included in the compute service provider 900 include an admission control 1014, e.g., one or more computers operating together as an admission control web service. The admission control 1014 can authenticate, validate and unpack the API requests for service or storage of data within the compute service provider 900. The capacity tracker 1016 is responsible for determining how the servers need to be configured in order to meet the need for the different instance types by managing and configuring physical inventory in terms of forecasting, provisioning and real-time configuration and allocation of capacity. The capacity tracker 1016 maintains a pool of available inventory in a capacity pool database 1018. The capacity tracker 1016 can also monitor capacity levels so as to know whether resources are readily available or limited. An instance manager 1050 controls launching and termination of instances in the network. When an instruction is received (such as through an API request) to launch an instance, the instance manager pulls resources from the capacity pool 1018 and launches the instance on a decided upon host server computer. Similar to the instance manager are the storage manager 1022 and the network resource manager 1024. The storage manager 1022 relates to initiation and termination of storage volumes, while the network resource manager 1024 relates to initiation and termination of routers, switches, subnets, etc. A network of partitions 1040 is described further in relation to FIG. 10 and includes a physical layer upon which the instances are launched.

A health monitoring service 1060 can provide monitoring for resources and the applications customers run on the compute service provider 900. System administrators can use the monitoring service 1060 to collect and track metrics, and gain insight to how applications are running. For example, the monitoring service 1060 can allow system-wide visibility into application performance and operational health. Metrics generated by the health monitoring service 1060 can be stored in the metrics database 1062.

Figure 11:
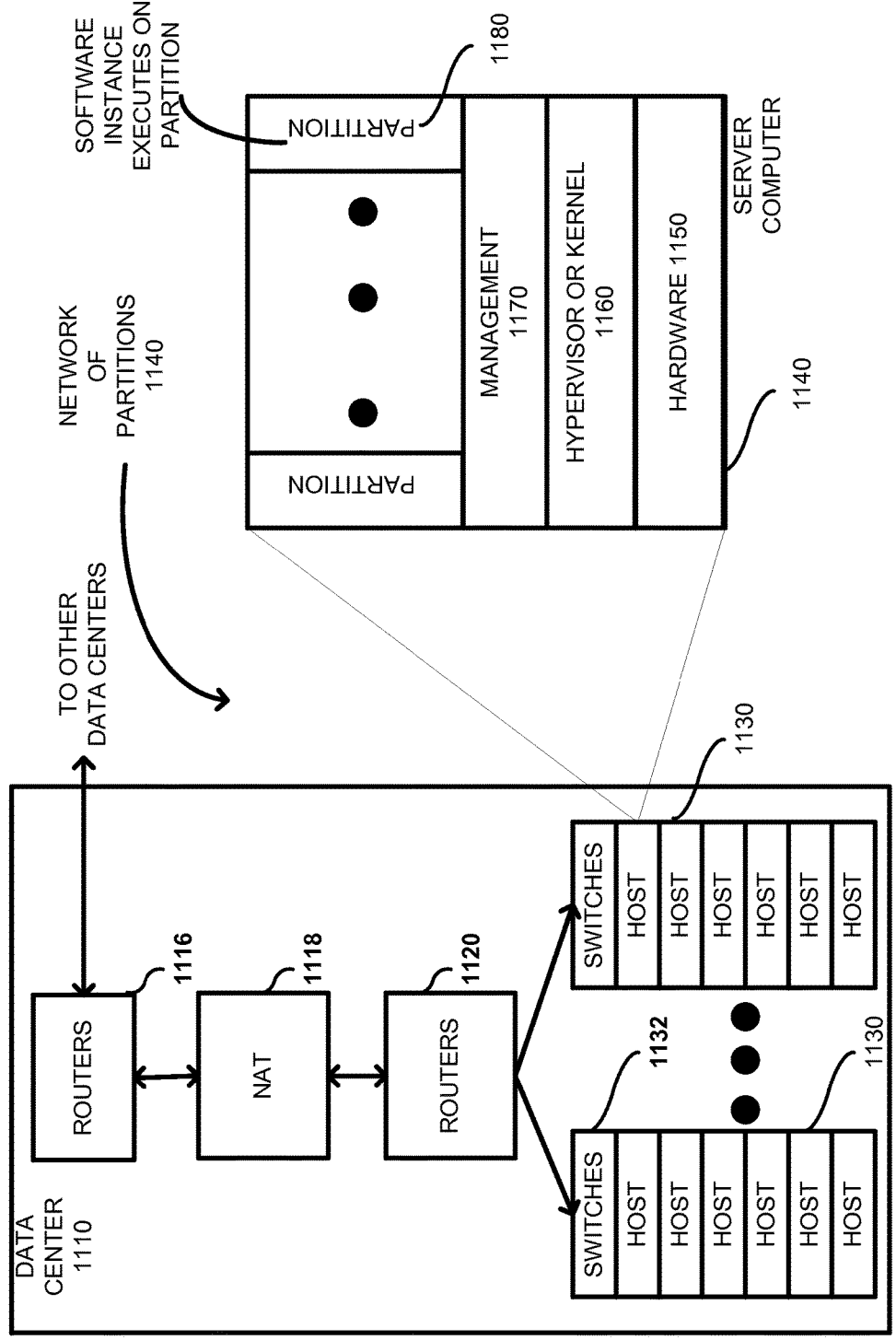
FIG. 11 shows an example of a plurality of host computers, routers and switches, which are hardware assets used for running virtual machine instances.

FIG. 11 illustrates the network of partitions 1040 and the physical hardware associated therewith. The network of partitions 1040 can include a plurality of data centers, such as data center 1110, coupled together by routers 1116. The routers 1116 read address information in a received packet and determine the packet's destination. If the router decides that a different data center contains a host server computer, then the packet is forwarded to that data center. If the packet is addressed to a host in the data center 1110, then it is passed to a network address translator (NAT) 1118 that converts the packet's public IP address to a private IP address. The NAT also translates private addresses to public addresses that are bound outside of the datacenter 1110. Additional routers 1120 can be coupled to the NAT to route packets to one or more racks of host server computers 1130. Each rack 1130 can include a switch 1132 coupled to multiple host server computers. A particular host server computer is shown in an expanded view at 1140.

Each host 1140 has underlying hardware 1150 including one or more CPUs, memory, storage devices, etc. Running a layer above the hardware 1150 is a hypervisor or kernel layer 1160. The hypervisor or kernel layer can be classified as a type 1 or type 2 hypervisor. A type 1 hypervisor runs directly on the host hardware 1150 to control the hardware and to manage the guest operating systems. A type 2 hypervisor runs within a conventional operating system environment. Thus, in a type 2 environment, the hypervisor can be a distinct layer running above the operating system and the operating system interacts with the system hardware. Different types of hypervisors include Xen-based, Hyper-V, ESXi/ESX, Linux, etc., but other hypervisors can be used. A management layer 1170 can be part of the hypervisor or separated therefrom and generally includes device drivers needed for accessing the hardware 1150. The partitions 1180 are logical units of isolation by the hypervisor. Each partition 1180 can be allocated its own portion of the hardware layer's memory, CPU allocation, storage, etc. Additionally, each partition can include a virtual machine and its own guest operating system. As such, each partition is an abstract portion of capacity designed to support its own virtual machine independent of the other partitions.

Any applications executing on the instances can be monitored using the management layer 1170, which can then pass the metrics to the health monitoring service 1060 for storage in the metrics database 1062. Additionally, the management layer 1170 can pass to the monitoring service 1050 the number of instances that are running, when they were launched, the operating system being used, the applications being run, etc. All such metrics can be used for consumption by the health monitoring service 1060 and stored in database 1062.

The packet duplication technologies described herein can be implemented by the networking devices (e.g., 1116, 1118, and/or 1120) and hosts (e.g., 1130) depicted in FIG. 11. For example, the router 1116 can be configured to manage duplicate network packets (e.g., multiple encapsulating network packets and/or duplicate TCP network packets) that are communicated between data center 1110 and other data centers via multiple network paths.

Figure 12:
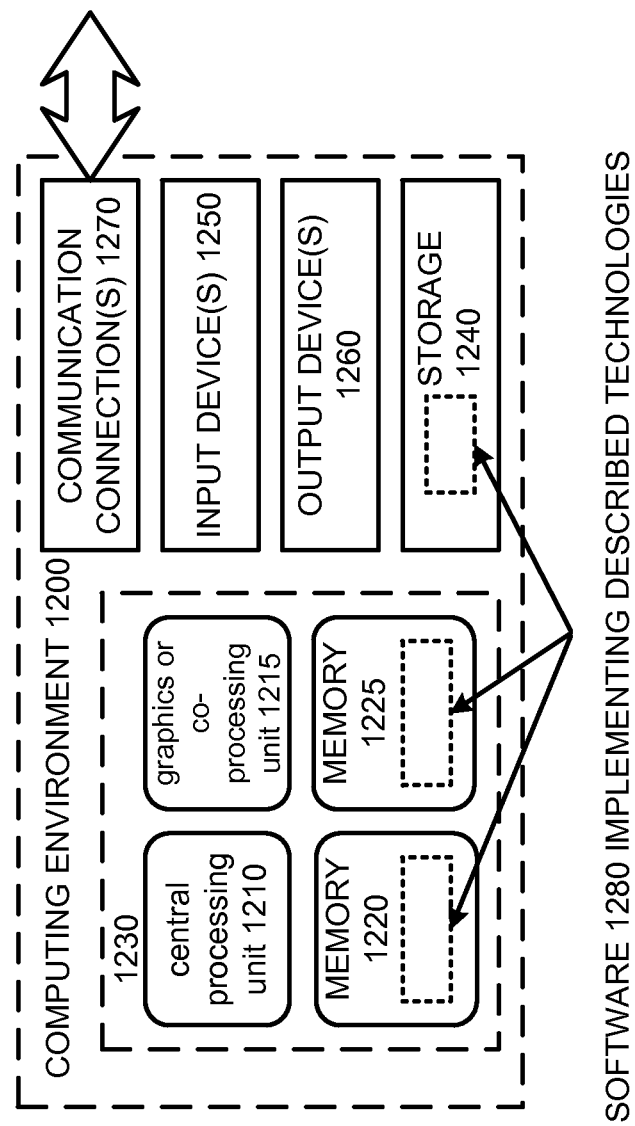
FIG. 12 depicts a generalized example of a suitable computing environment in which the described innovations may be implemented.

FIG. 12 depicts a generalized example of a suitable computing environment 1200 in which the described innovations may be implemented. The computing environment 1200 is not intended to suggest any limitation as to scope of use or functionality, as the innovations may be implemented in diverse general-purpose or special-purpose computing systems. For example, the computing environment 1200 can be any of a variety of computing devices (e.g., desktop computer, laptop computer, server computer, tablet computer, etc.)

With reference to FIG. 12, the computing environment 1200 includes one or more processing units 1210, 1215 and memory 1220, 1225. In FIG. 12, this basic configuration 1230 is included within a dashed line. The processing units 1210, 1215 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 12 shows a central processing unit 1210 as well as a graphics processing unit or co-processing unit 1215. The tangible memory 1220, 1225 may be volatile memory (e.g., registers, cache, RAM), non-volatile memory (e.g., ROM, EEPROM, flash memory, etc.), or some combination of the two, accessible by the processing unit(s). The memory 1220, 1225 stores software 1280 implementing one or more innovations described herein, in the form of computer-executable instructions suitable for execution by the processing unit(s).

A computing system may have additional features. For example, the computing environment 1200 includes storage 1240, one or more input devices 1250, one or more output devices 1260, and one or more communication connections 1270. An interconnection mechanism (not shown) such as a bus, controller, or network interconnects the components of the computing environment 1200. Typically, operating system software (not shown) provides an operating environment for other software executing in the computing environment 1200, and coordinates activities of the components of the computing environment 1200.

The tangible storage 1240 may be removable or non-removable, and includes magnetic disks, magnetic tapes or cassettes, CD-ROMs, DVDs, or any other medium which can be used to store information in a non-transitory way and which can be accessed within the computing environment 1200. The storage 1240 stores instructions for the software 1280 implementing one or more innovations described herein.

The input device(s) 1250 may be a touch input device such as a keyboard, mouse, pen, or trackball, a voice input device, a scanning device, or another device that provides input to the computing environment 1200. The output device(s) 1260 may be a display, printer, speaker, CD-writer, or another device that provides output from the computing environment 1200.

The communication connection(s) 1270 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include signals and carrier waves, and does not include communication connections. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. Therefore, what is claimed as the invention is all that comes within the scope of these claims.

What is claimed is:

1. A method, implemented at least in part by a sending host, for performing packet duplication in an Internet protocol (IP) packet-switched network, the method comprising:
   obtaining a network packet to be sent from the sending host to a destination host;
   creating a first encapsulating network packet comprising:
      a first copy of the network packet; and
      a first network path indicator;
   creating a second encapsulating network packet comprising:
      a second copy of the network packet; and
      a second network path indicator;
   sending the first encapsulating network packet to the destination host via the IP packet-switched network; and
   sending the second encapsulating network packet to the destination host via the IP packet-switched network;
   wherein the first copy of the network packet and the second copy of the network packet are duplicates of the network packet, wherein the first and second encapsulating network packets contain different network path indicators, and wherein the first network path indicator specifies a different network path within the IP packet-switched network, between the sending host and the destination host, from the second network path indicator.

2. The method of claim 1 wherein the first network path indicator is a first source port number and wherein the second network path indicator is a second source port number different from the first source port number.

3. The method of claim 2 wherein the first and second source port numbers are stored in source port fields of their respective encapsulating network packet headers.

4. The method of claim 1 wherein the first and second network path indicators are located in header information of their corresponding encapsulating network packets.

5. The method of claim 1 further comprising:
creating one or more additional encapsulating network packet comprising:
one or more additional copies of the network packet; and
one or more additional network path indicator.

6. The method of claim 1 wherein the first and second encapsulating network packets are created in software of the sending host.

7. The method of claim 1 wherein the network packet is one of a Transmission Control Protocol (TCP) network packet and a User Datagram Protocol (UDP) network packet.

8. The method of claim 7 wherein the first and second encapsulating network packets are UDP encapsulating network packets that encapsulate their corresponding copies of the network packet.

9. The computing device of claim 1,
wherein the first network path indicator instructs a router receiving the first encapsulating network packet sent by the sending host to route the first encapsulating network packet via a first network path to the destination,
wherein the second network path indicator instructs the router receiving the second encapsulating network packet sent by the sending host to route the second encapsulating network packet via a second network path to the destination, and
wherein the first network path and the second network path are different network paths.

10. A computing device implementing a network router, the computing device comprising:
one or more processing units; and
one or more network interfaces;
the computing device configured to performing operations for managing duplicate packets in an Internet protocol (IP) packet-switched network, the operations comprising:
receiving a first encapsulating network packet comprising:
a first copy of a network packet being sent from a sending host to a destination host; and
a first network path indicator;
receiving a second encapsulating network packet comprising:
a second copy of the network packet being sent from the sending host to the destination host, wherein the second copy of the network packet is a duplicate of the first copy of the network packet; and
a second network path indicator;
wherein the first and second encapsulating network packets contain different network path indicators;
sending the first encapsulating network packet to the destination host via a first network path within the IP packet-switched network; and
sending the second encapsulating network packet to the destination host via a second network path within the IP packet-switched network different from the first network path.

11. The computing device of claim 10 wherein the computing device comprises a plurality of network interfaces, wherein the first encapsulating network packet is sent via a first network interface of the plurality of network interfaces, and wherein the second encapsulating network packet is sent via a second network interface of the plurality of network interfaces.

12. The computing device of claim 10, the operations further comprising:
determining the first network path for sending the first encapsulating network packet based on the first network path indicator; and
determining the second network path for sending the second encapsulating network packet based on the second network path indicator.

13. The computing device of claim 10 wherein the first network path indicator is a first source port number and wherein the second network path indicator is a second source port number different from the first source port number.

14. The computing device of claim 13 wherein the first and second source port numbers are stored in source port fields of their respective encapsulating network packet headers.

15. The computing device of claim 10 wherein the first and second network path indicators are located in network protocol headers of their corresponding encapsulating network packets.

16. The computing device of claim 10 wherein the network packet is one of a Transmission Control Protocol (TCP) network packet and a User Datagram Protocol (UDP) network packet, and wherein the first and second encapsulating networks packet are UDP encapsulating network packets that encapsulate their corresponding copies of the network packet.

17. A computer-readable storage medium storing computer-executable instructions for causing a destination host to perform a method for receiving duplicate packets in an Internet protocol (IP) packet-switched network, the method comprising:
receiving at least one of:
a first encapsulating network packet comprising:
a first copy of a network packet being sent to the destination host; and
a first network path indicator stored in header information of the first encapsulating network packet; and
a second encapsulating network packet comprising:
a second copy of the network packet being sent to the destination host, wherein the second copy of the network packet is a duplicate of the first copy of the network packet; and
a second network path indicator stored in header information of the second encapsulating network packet;
wherein the first and second encapsulating network packets contain different network path indicators, and wherein the second network path indicator specifies a different network path within the IP packet-switched network than the first network path indicator;

obtaining the network packet by extracting at least one of the first copy of the network packet and the second copy of the network packet; and processing the obtained network packet.

18. The computer-readable storage medium of claim 17, the method further comprising:

detecting that the first encapsulating network packet and the second encapsulating network packet contain duplicate copies of the network packet based on one or more of:

comparison of sequence numbers for the first and second encapsulating network packets; and comparison of hash values for the first copy of the network packet and the second copy of the network packet.

19. The computer-readable storage medium of claim 17, the method further comprising:

passing the first and second encapsulating network packets to software of the destination host for detecting duplicates, wherein the software performs the obtaining and the processing.

20. The computer-readable storage medium of claim 17 wherein the network packet is one of a Transmission Control Protocol (TCP) network packet and a User Datagram Protocol (UDP) network packet, and wherein the first and second encapsulating networks packet are UDP encapsulating network packets that encapsulate their corresponding copies of the network packet.

* * * * *